Patented Feb. 10, 1931

1,792,103

UNITED STATES PATENT OFFICE

HANS LEHRECKE, OF FRANKFORT-ON-THE-MAIN, GERMANY, ASSIGNOR TO THE DEUTSCHE GOLD & SILBER SCHEIDEANSTALT, VORMALS ROESSLER, OF FRANKFORT-ON-THE-MAIN, GERMANY, A CORPORATION

PROCESS FOR THE STABILIZATION OF HYDROCYANIC ACID

No Drawing. Original application filed June 23, 1926, Serial No. 118,090, and in Germany July 3, 1925. Divided and this application filed July 18, 1928. Serial No. 293,792.

The object of this invention is to stabilize liquefied hydrocyanic acid against polymerization and decomposition and relates to the use of ionizable or hydrolyzable compounds for this purpose. This application is a division of my copending application S. N. 118,090 filed June 23, 1926.

The stabilization of liquid hydrocyanic acid has previously been accomplished by the addition of mineral acids such as sulphuric and hydrochloric. These methods have not, however, been wholly satisfactory. I have now found that a much more satisfactory method is to add to the liquid hydrocyanic acid organic acid products which are capable of hydrolysis. Such products are for example, the organic esters of halogen substituted organic acids, more particularly the ester of the aliphatic acids, such as for example, bromoacetic acid. In all cases it has been found that small amounts of the stabilizing material were sufficient to give excellent results. The quantities necessary for producing a lasting stabilizing effect depend partly upon the amount of water contained in the hydrocyanic acid, partly upon the purity of the acid and further upon the action of the container in which the mixture is stored. In some cases 0.5 to 1% of the stabilizing material is necessary for a successful stabilization, whilst in others as much as 5% are required.

A suitable stabilized hydrocyanic acid mixture is illustrated by the following composition (when hydrocyanic acid containing for instance 2 to 6 % of water is used) : 98% HCN 2% bromoacetic ethyl ester. Liquid hydrocyanic acid stabilized with materials of this invention will keep clear and bright and is not discolored for more than half a year when kept in vessels of a non-alkaline nature such as quartz, resistance glass and the like.

Claims:

1. Process for stabilizing liquid hydrocyanic acid against polymerization or decomposition which comprises adding to said hydrocyanic acid an ester of a halogen substituted organic acid.

2. Process for stabilizing liquid hydrocyanic acid against polymerization or decomposition which comprises adding to said hydrocyanic acid an ester of a halogen substituted aliphatic acid.

3. Process for stabilizing liquid hydrocyanic acid against polymerization or decomposition which comprises adding to said hydrocyanic acid an ester of a halogen substituted acetic acid.

4. Process for stabilizing liquid hydrocyanic acid against polymerization or decomposition which comprises adding to said hydrocyanic acid an ester of a bromine substituted aliphatic acid.

5. Process for stabilizing liquid hydrocyanic acid against polymerization or decomposition which comprises adding to said hydrocyanic acid an ester of a bromoacetic acid.

6. Process for stabilizing liquid hydrocyanic acid against polymerization or decomposition which comprises adding to said hydrocyanic acid an ethyl ester of a halogen substituted aliphatic acid.

7. Process for stabilizing liquid hydrocyanic acid against polymerization or decomposition which comprises adding to said hydrocyanic acid an ethyl ester of a halogen substituted acetic acid.

8. Process for stabilizing liquid hydrocyanic acid against polymerization or decomposition which comprises adding to said hydrocyanic acid an ethyl ester of bromoacetic acid.

9. As a new product, liquid hydrocyanic acid to which has been added an ester of a halogen substituted organic acid as a stabilizer.

10. As a new product, liquid hydrocyanic acid to which has been added an ester of a halogen substituted acetic acid as a stabilizer.

11. As a new product, liquid hydrocyanic acid to which has been added an ester of a bromine substituted aliphatic acid as a stabilizer.

12. As a new product, liquid hydrocyanic acid to which has been added an ester of a bromoacetic acid as a stabilizer.

13. As a new product, liquid hydrocyanic acid to which has been added an ethyl ester of a halogen substituted acetic acid as a stabilizer.

14. As a new product, liquid hydrocyanic acid to which has been added an ethyl ester of bromoacetic acid.

Signed at Frankfort A/M., Germany, this 27th day of June, A. D. 1928.

HANS LEHRECKE.